United States Patent [19]
Smith

[11] Patent Number: 6,145,053
[45] Date of Patent: Nov. 7, 2000

[54] DATA SECURITY METHOD USING HEAD DISK STICTION

[75] Inventor: Gordon James Smith, Rochester, Minn.

[73] Assignee: International Business Machines Corporation, Armonk, N.Y.

[21] Appl. No.: 09/205,123

[22] Filed: Dec. 3, 1998

[51] Int. Cl.[7] .............................. G06F 12/14; G06F 13/16
[52] U.S. Cl. ........................... 711/112; 711/164; 713/202; 360/75
[58] Field of Search ..................................... 711/164, 112, 711/111, 163; 713/202, 200; 360/75

[56] References Cited

U.S. PATENT DOCUMENTS

| | | | |
|---|---|---|---|
| 5,375,243 | 12/1994 | Parzych et al. | 713/202 |
| 5,799,145 | 8/1998 | Imai et al. | 713/202 |
| 6,012,145 | 1/2000 | Mathers et al. | 713/202 |

*Primary Examiner*—Reginald G. Bragdon
*Attorney, Agent, or Firm*—Robert W. Lahtinen; Roy W. Truelson

[57] ABSTRACT

A disk drive data security system provides for inactivating the disk drive by landing and stopping the transducer heads on the highly polished disk data surface causing adhesion or stiction between head and disk that cannot be overcome by starting the spindle motor that rotates the disks. To provide maximum resistance to starting torque, the heads are landed near the outer diameter of the highly polished disk data storage surface portion. Instead of avoiding adhesion, the maximum stiction is sought to prevent disk drive operation in those environments requiring a high level of security such as extremely sensitive data or portable computers containing sensitive data which are stolen and beyond the possession and control of the individuals entitled to use the data. The disablement of the drives may be invoked by the occurrence of a predetermined number of successive unsuccessful attempts to enter a password that facilitates access to the data stored on the drive. The predetermined number can also be randomly varied to further discourage access attempts by trial and error.

11 Claims, 2 Drawing Sheets

DATA SECURITY METHOD USING HEAD DISK STICTION

FIELD OF THE INVENTION

The present invention relates to rigid disk data storage systems and more particularly to a security system for disk drives on which is stored sensitive or confidential data to which access is to be limited.

BACKGROUND OF THE INVENTION

The necessity to rely on data resident within a computer for the efficient conduct of personal and business activities creates a vulnerability to damage associated with the loss of valuable information. The theft of such data maybe used to steal or compromise financial assets, impair business relationships, or compromise the value of business information or research by unfairly obtaining the work product of a person or business.

Computer theft, particularly for portable computers, is a growing problem. Despite the small size of these systems, the progressively increasing storage capacity of the disk drives forming a part of the system, not only adds to the function and usefulness of the computer, but also puts increased quantities of valuable data at risk when the computer is stolen or tampered with. If a drive is stolen and physically out of the possession of the individual entitled to access and use, the security of data should be effected by extraordinary means causing destruction beyond any reasonable possibility of recovery rather than by a less terminal means which impairs access, but can with skill be overcome. Even with system password protection, the data on a hard drive can be extracted with special tools available on the open market. If the contents of the hard drive can be made inaccessible through a hardware feature, the data resident on the drive is much less likely to be compromised. Further, if the stored data will not be available and the function of the computer system becomes impaired, a substantial part of the incentive to steal or tamper with the system would be eliminated.

SUMMARY OF THE INVENTION

The present invention teaches the immobilization of a disk drive when it is sensed that an unauthorized access of the data is being attempted. Such an attempt can be the repeated accessing of the drive without the proper password. A consecutive number of attempts can be selected which tolerates the inadvertent or accidental use of an incorrect password while denying access to one who uses random passwords or even one who makes enlightened choices among likely passwords.

When practicing the present invention, password information is stored on the hard drive as is the case for many operating systems, such as WINDOWS 95. For these systems, the hard drive is not assessable by the operating system unless the user enters the correct password. This invention requires inclusion in the microcode of the drive a command to stop the head in the polished area of the disks. This command can be given by the host system, for example. As nearly all disk drive manufacturers use polished disk surface when recording data (in order to achieve low fly height and thereby greater data density), disk drives must include a method to avoid having the heads land in the polished region. The smooth disk and head surfaces mate nearly perfectly when stationary and the phenomenon of "stiction" takes over. Stiction is very undesirable causing all drive manufacturers to go great lengths to avoid its occurrence.

The file microcode, upon receiving a command to "vegetablize the disk drive", spins up the drive as normal. There are then two modes of operation to be considered. For a drive with head load/unload, it may not be necessary to actually start spindle rotation. The "vegetable state"(VS) can be entered by doing a load operation onto a stationary disk pack. This is advantageous, because heads stuck near the outer diameter (OD) of the disk pack produce a higher torque resistance due to stiction by about a factor of two compared to heads stuck at the inner diameter (ID). In either case, ID or OD, the stiction forces are the same. Alternatively, for the load/unload case, the drive can spin up as normal and then do a normal head load. Following this the motor is stopped while the actuator current is such that the head remains away from the unload mechanism. For example, the actuator coil is energized by a current with direction necessary to keep the head at the inner diameter of the disks.

In the other principal environment, where heads are stopped and started in a textured region on each disk surface, the following method can be used. After the normal power-up sequence for the drive, the heads are moved away from the start/stop zone. For example, nearly all disk drive manufacturers that have a start/stop area on the disks, place such landing zone at the disk ID to reduce starting torque. Therefore, this invention teaches that for the start/stop case, the heads should be moved to the outer diameter of the disks and then the spindle motor should be stopped. The head can be held at the OD by using a small amount of current in the actuator voice coil while the spindle is slowed to a "stick".

DETAILED DESCRIPTION

Figure 1:
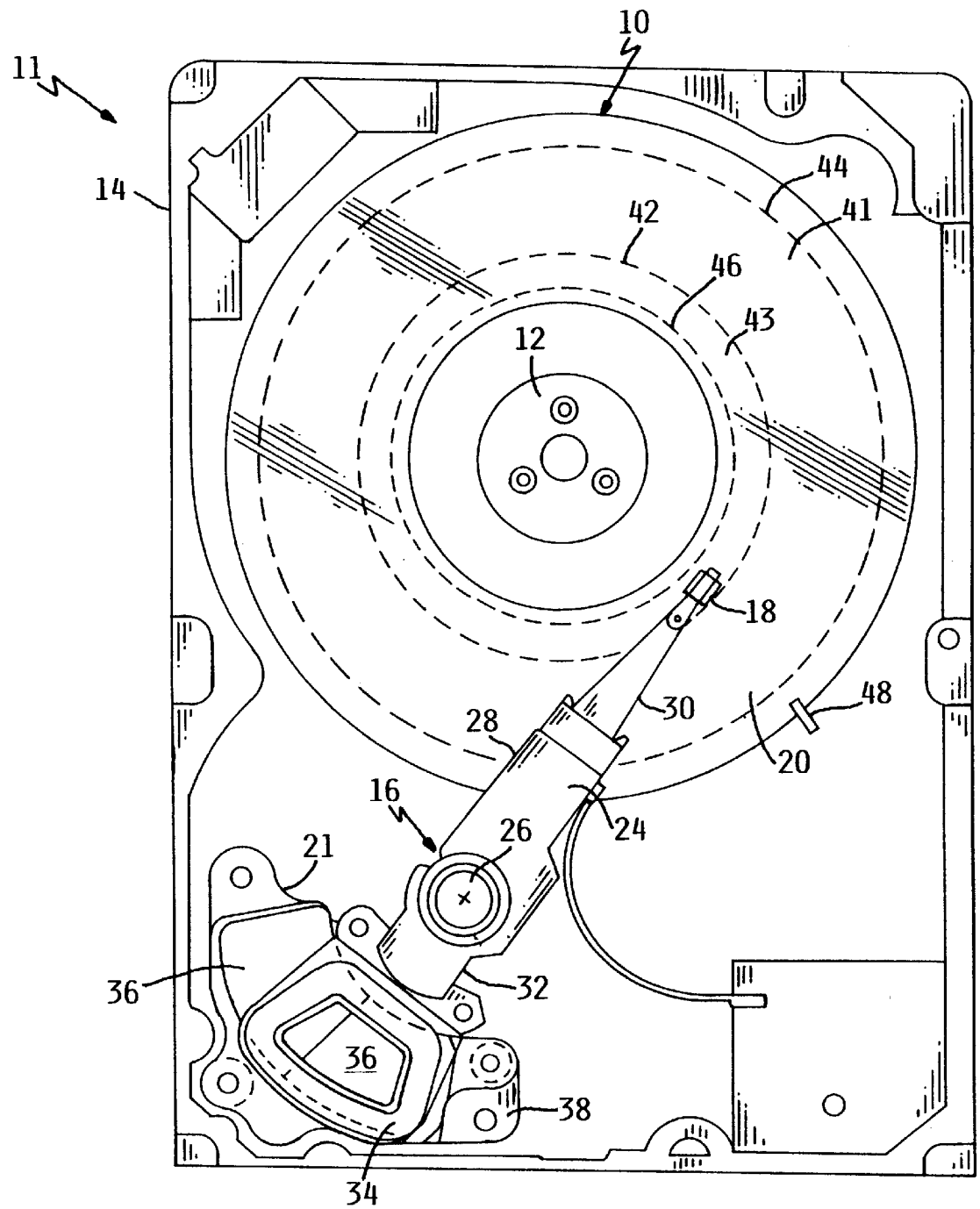
FIG. 1 illustrates a typical rigid disk drive with the cover and upper plate of the actuator voice coil motor stator assembly removed and indicating bands of tracks on the disk surface.

FIG. 1 illustrates a typical rigid disk drive 11 for data storage including one or more disks 10 mounted for rotation about a spindle 12 which is supported on a rigid base or frame 14. An actuator assembly 16 supports the transducer heads 18 that record data on and read data from the disk surfaces 20. The actuator assembly 16 includes a stationary portion 21 secured to base 14 and a pivotable portion 24 which pivots about a stationary post 26. Actuator arms 28 carry flexures 30 which in turn support the transducer heads 18 that confront the disk surface. The flexure 30 allows the transducer head 18 to move toward and away from the disk surface 20 and a gimbal connection (not shown) between flexure and transducer head allows the head to pitch and roll during flight. An arm 32, at the side of the pivotable actuator assembly opposite the transducer carrying arms 28, supports a voice coil 34 which is part of a voice coil motor (VCM) that drives and controls the pivotal motion of the actuator assembly. The VCM includes permanent magnets 36 supported on the bottom plate 38 formed of magnetically permeable material. An upper plate member (not shown) of magnetically permeable material is attached to the portion 21 to form a flux path which is interrupted by a gap across which magnetic flux flows. The coil 34, supported on arm 32, is positioned in the air gap and drives the actuator pivotable portion in one rotational direction when current flows through the coil in one direction and drives the actuator pivotable portion in the opposite direction when the current through the coil is reversed. A cover (not shown) is secured to base or frame member 14 to form a hermetic seal and thereby exclude particulate or contaminant materials from the enclosure.

To effectively write data to or read data from the disk surface 20, there must be minimal separation between the transducer head 18 and the surface of the disk. As data storage densities increase, a mandatory requirement is the progressive reduction of the head disk separation during operation. Currently head disk spacing for state of the art disk drives is approximately 1.8 microinches. To avoid damage and enable proper data transfer operations, both the disk data surface and the confronting transducer head rails or air bearing surfaces must be highly polished to prevent any protrusion that would cause contact while maintaining the required close spacing. In designing a disk drive, the entire band of tracks 41, from 42 to 44, over which the head can fly while reliably and consistently maintaining head to disk separation for data transfer is used for data storage to maximize the data storage capacity of each disk surface. However, at both the OD and ID there remains a region over which the head will fly which can be used for landing and parking the head. The selected landing zone is textured to form grooves, crevices, or bumps in the surface such that the polished surface is discontinuous with lands defining a smooth though partial surface in contact with the air bearing rail surfaces of the head.

If the air bearing surfaces of the transducer heads are allowed to come to rest on the polished disk data surface, the two highly polished surfaces are in such intimate contact that adhesion occurs. When the two super smooth surfaces of the disk data surface and the transducer head air bearing rail surfaces are brought into contact, the adhesion is similar to that of stacked gage blocks that have been used by mechanics, which when brought into contact could not be lifted apart, but could only be separated by sliding one block completely off the edge of the adjoining block. Further, disk drive spindle motors are designed to have the lowest power that will reliably rotate the disk assembly to both achieve minimum size and reduce heat dissipation. The relatively low power of the spindle motor, which rotates the disk stack is not enough to break the adhesion and were the motor strong enough to free the transducer heads from the disk surface, it is likely that the suspension systems that secure the transducer heads to the flexures would be damaged. To counter this phenomena, drive designers avoid landing transducer heads on polished surfaces by providing landing zones at the OD or ID, such as the region of concentric tracks 43 between lines 42 and 46, removed from the data surface that are textured or roughened to support the head air bearing surfaces without any significant adhesion or stiction. Most drive designers will elect to have the landing zone at the ID to reduce the torque required to overcome any adhesion between transducers and disk surfaces when beginning disk rotation during the drive startup. Further, the tracks at the OD are the most effective for storing data. An alternate method is to provide ramps 48 at the outer diameter of the disk which provide inclined surfaces that engage the suspension and cam the head away from the disk surface while the heads are still flying when the actuator is pivoted to the outer diameter during the drive shut down procedure or when the drive is stopping due to power failure.

In practicing the present invention, after an event that indicates that unauthorized access is being attempted, the control microcode initiates drive operation and then terminates operation, allowing the transducer heads to land on the polished disk data surface, permitting the adhesion or stiction to make the drive inoperable. The event that invokes the drive disabling security measure would typically be the entering of a sequence of a predetermined number of invalid passwords or code words which are indicative of an unauthorized access attempt. Prior to invoking the security procedure, the system may implement a warning message to inform the user that initiation of the data protection is imminent unless a proper access code is entered. The use by an unauthorized person may also be discouraged by randomly changing the number of access attempts that will be tolerated prior to invoking the security procedure.

Figure 2:
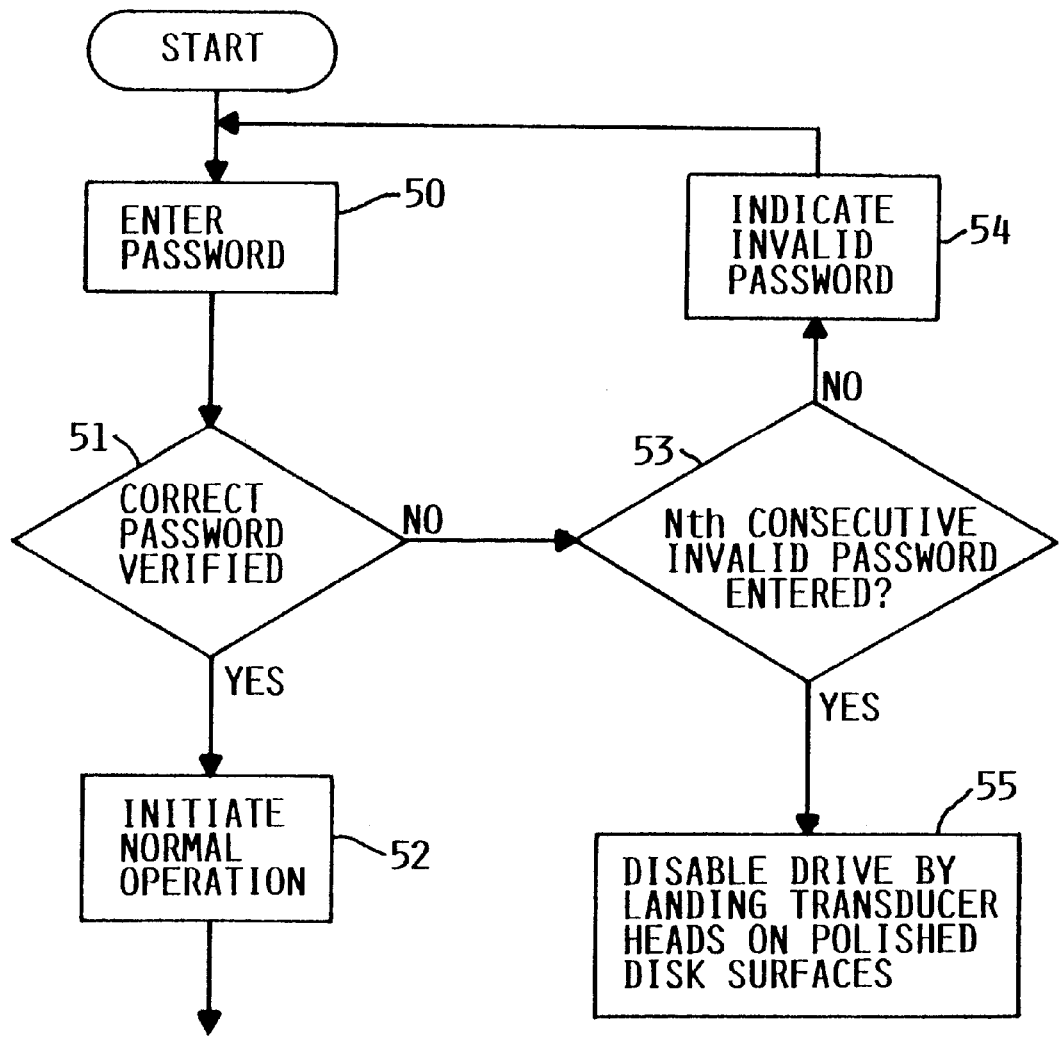
FIG. 2 is a block diagram illustrating the microcode that implements the disk drive start up and includes the security system of the present invention.

As shown by the flow chart of FIG. 2. which illustrates a portion of the control microcode, the drive start sequence calls for a password to be entered (block 50 ), which if determined to be correct (block 51), initiates normal drive operation (block 52). If the password is invalid, it is sensed at block 53 whether this is the Nth consecutive invalid password entered. The Nth number may be either a predetermined number or a random number indicative of an attempted unauthorized access. If the consecutively entered invalid password is less than the Nth, the password is indicated as invalid (block 54 ) and the sequence is continued allowing the entry of another password. If the Nth number of consecutive invalid passwords is sensed at block 53, the disabling means (block 55) is initiated and the transducer heads are landed on polished disk surfaces permitting adhesion or stiction to make the drive inoperable.

What is claimed is:

1. In a data storage system including a rigid disk drive data storage device including at least one disk rotated by a spindle motor, at least one transducer head that flies over at least one respective confronting disk surface that includes a highly polished data storage surface portion and a security means, for preventing unauthorized access to data, that must be satisfied to enable access to stored data, a data protection system comprising sensing means for sensing consecutive unsuccessful attempts to satisfy said security means, and disabling means invoked by said sensing means and operable to disable said disk drive by landing said at least on transducer head on said respective at least one disk highly polished data storage surface portion, whereby the at least one transducer head sticks to the respective disk polished surface with an adhesive force that requires a greater starting torque than can be supplied by said spindle motor at startup.

2. The data storage system of claim 1 wherein said security means is a password and said sensing means senses and accumulates the number of consecutive failed attempts to correctly enter said password.

3. The data storage system of claim 2 wherein said disabling means, when invoked, initiates operation of said rigid disk drive, but inactivates the drive and lands the at least one transducer head on the respective disk highly polished data storage surface portion prior to accessing data.

4. The data processing system of claim 3 wherein said disabling means lands the at least one transducer head on said respective disk highly polished data storage surface portion adjacent the outer diameter thereof.

5. A security system for a rigid disk data storage device which includes at least one rotating disk that presents at least one data surface and at least one transducer that flies over a respective highly polished data surface portion to write data to and read data from the disk surface comprising:

password means for preventing unauthorized access to data, comprising a password which must be entered prior to gaining access to data stored on such device;

sensing means for sensing the number of successive unsuccessful attempts to enter said password; and disabling means which is invoked when the number of successive unsuccessful attempts to enter said password have exceeded a predetermined number, for disabling said device by landing said at least one transducer on the respective highly polished disk data surface portion.

6. The security system of claim 5 wherein said disabling means initiates disk rotation and transducer flight, moves said at least one transducer over said respective highly polished disk data surface portion and terminates disk rotation prior to accessing data stored on said at least one disk, whereby said at least one transducer sticks to said respective highly polished disk data surface portion.

7. A method of securing data stored on a rigid disk data storage device including at least one data storage disk which is rotated by a spindle motor and wherein data is written on and read from at least one ultra smooth disk data surface by a respective transducer head that flies over the disk surface and is separated therefrom by a film of air, the method comprising:

determining that an unauthorized access to data stored on the disk is being attempted;

interrupting normal drive operating instructions in response to determining that an unauthorized access is being attempted; and causing the respective transducer head to land and come to rest on said at least one ultra smooth disk data surface.

8. The security method of claim 7 wherein said data storage device includes a password used to gain access to stored data and said step of determining when unauthorized access is being attempted comprises determining that a predetermined number of consecutive unsuccessful attempts to enter said password have occurred.

9. The security method of claim 8 wherein the step of causing the respective transducer head to land on at least one data surface comprises starting said spindle motor and initiating transducer head flight followed by stopping disk rotation and landing said respective transducer head on the at least one confronting disk surface without invoking the shut down procedure that causes the transducer head to be removed from the data surface prior to termination of head flight.

10. The security method of claim 7 wherein said step determining unauthorized access comprises determining whether a predetermined number of successive invalid passwords have been entered seeking access to data stored on said rigid disk data storage device.

11. The security method of claim 10 wherein said predetermined number of successive invalid passwords is randomly varied.

* * * * *